July 19, 1949.   R. E. COLANDER   2,476,840
DIRECT READING MULTIFREQUENCY GENERATOR
Filed Dec. 30, 1947   2 Sheets-Sheet 1
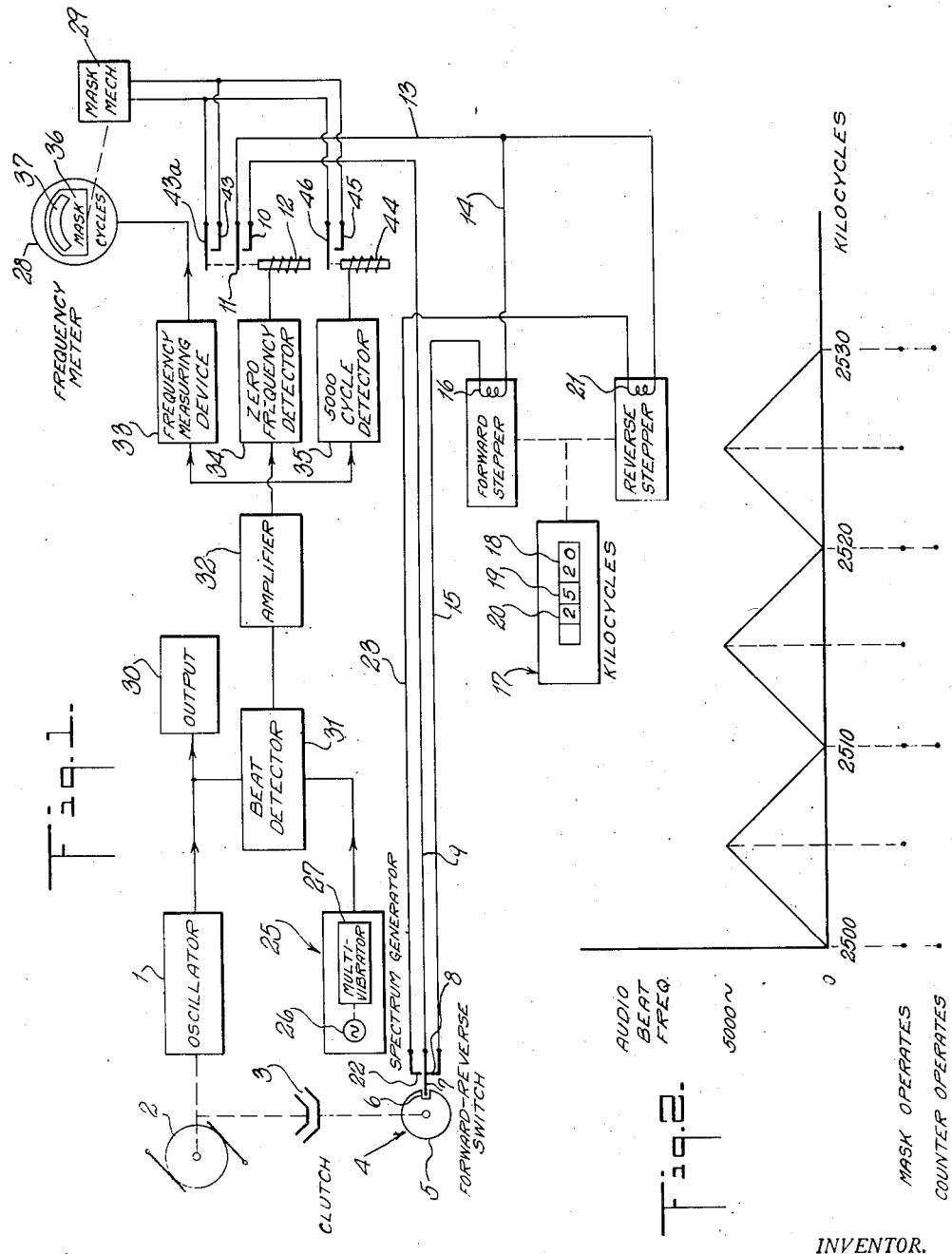
INVENTOR.
ROY E. COLANDER
BY
John J. Rogan
ATTORNEY July 19, 1949.   R. E. COLANDER   2,476,840
DIRECT READING MULTIFREQUENCY GENERATOR
Filed Dec. 30, 1947   2 Sheets-Sheet 2
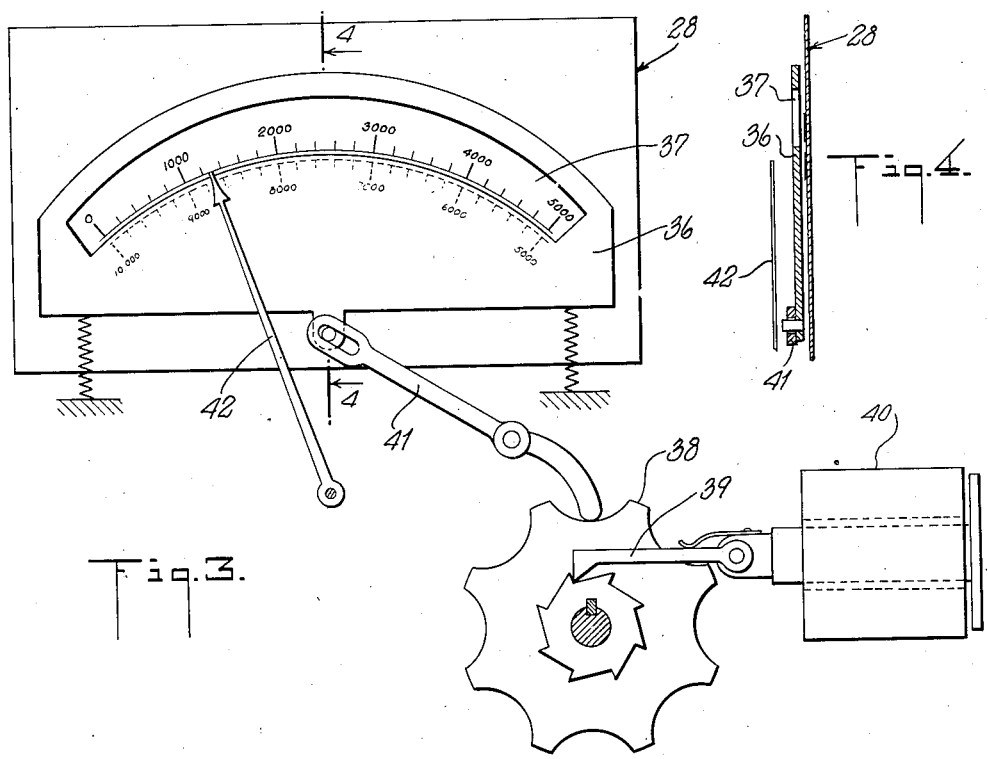
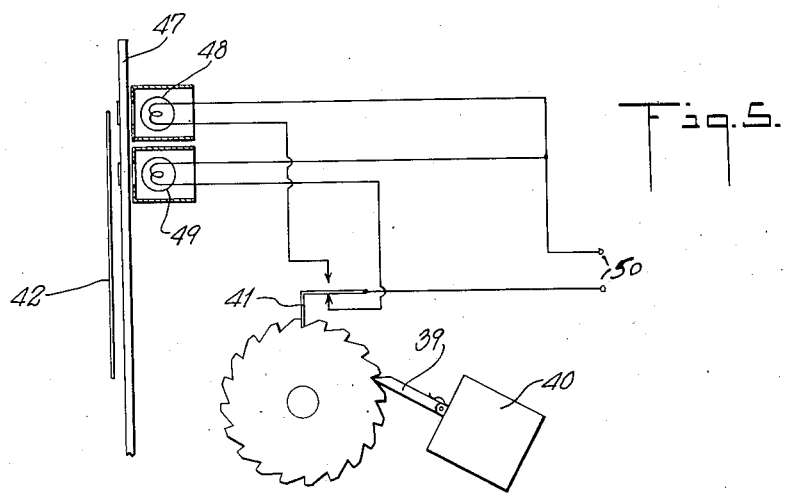
INVENTOR.
ROY E. COLANDER
BY John J. Rogan
ATTORNEY Patented July 19, 1949

2,476,840

UNITED STATES PATENT OFFICE 2,476,840

DIRECT READING MULTIFREQUENCY GENERATOR

Roy E. Colander, Boulder, Colo., assignor to Collins Radio Company, Cedar Rapids, Iowa, a corporation of Iowa Application December 30, 1947, Serial No. 794,509

16 Claims. (Cl. 250—36)

This invention relates to frequency generators and more especially to so-called signal generators such as are used in radio testing, calibrating and the like.

A principal object of the invention is to provide an improved arrangement for selectively setting the output frequency of an oscillator, and for simultaneously and automatically indicating the selected frequency.

Another object is to provide a direct reading frequency generator which can be used with a replaceable oscillator without disturbing the accuracy of the frequency indication.

Another object is to provide an adjustable frequency generator of the direct reading type wherein there is avoided the necessity of employing tuning arrangements for the oscillator which would normally have to be of linear characteristic or of some other known or definite characteristic.

A feature of the invention relates to a direct reading frequency indicator arrangement for signal generators, whereby the indications are produced as a composite numerical indication on a conventional rotatable dial counter and upon a calibrated frequency meter.

Another feature relates to a direct reading frequency indication arrangement for signal generators and the like, employing a counter of the cumulative digit dial type for indicating a coarse frequency setting, and a frequency calibrated meter for indicating the interpolated or fine frequency settings, in conjunction with a spectrum generator which produces a series of uniformly spaced frequency check points and a cooperating special frequency detection circuit for controlling the operation of the counter and meter in response to variable settings of the oscillator.

A further feature relates to the novel organization, arrangement and relative interconnection of parts which cooperate to provide an improved direct reading signal frequency generator.

In the drawing which shows, by way of example, certain preferred embodiments,

Fig. 1 is a composite schematic circuit and block diagram of a system according to the invention.

Fig. 2 is a graph explanatory of the operation of Fig. 1.

Fig. 3 is an enlarged detailed view of the frequency meter of Fig. 1.

Fig. 4 is a sectional view of Fig. 3, taken along the lines 4—4 thereof.

Fig. 5 is a modification of Fig. 3.

Referring to Fig. 1, there is represented by the block 1, any well-known oscillator such as is customarily employed in signal generators. It may comprise, for example, a grid-controlled electron tube having a tuning circuit with one or more adjustable elements for changing the oscillator frequency over the desired range in continuous frequency increments. Merely for illustration, it will be assumed that the oscillator 1 is to cover the range of 2500 kilocycles to 7500 kilocycles. The tuning element of oscillator 1 is provided with a manually settable knob 2 which is coupled through a suitable slip friction clutch 3 to a forward-reverse switch 4, comprising for example a disc 5 having a peripheral knob 6 which registers with the operating switch arm 7 of a single-pole double-throw toggle switch. Thus, when knob 2 is turned clockwise to increase the frequency of oscillator 1, it operates arm 7 to close with contact 8. The arm 7 then acts as a stop to limit any further rotation of disc 5, but allowing the knob 2 to be continuously rotated. The switch arm 7 is connected over conductor 9 to the normally open contacts 10, 11, of an electromagnetic relay switch 12. Contacts 10, 11, when closed, as will be described, complete a circuit over conductors 9, 13, 14, 15, and the contacts 7 and 8 to the winding 16 of the forward stepping mechanism associated with the dial counter 17. This counter may be of any well-known type comprising, for example, a tens dial 18, a hundreds dial 19, a thousands dial 20. The dial 18 is calibrated in 10 equally spaced markings from 00, 10 . . . 90, and is rotatable in a step-by-step manner to indicate these successive 10 kilocycle steps. The dials 19 and 20 are cumulative and decumulative with respect to the rotation of dial 18, thus for each successive ten steps of dial 18 in one direction, the dial 19 is rotated one step in the same direction. Likewise, for each ten successive steps of dial 19, the dial 20 is rotated one step. Since numerical counter mechanisms of this type are well-known in the art, detailed description thereof is not necessary herein. Under the above assumed range for oscillator 1 which has a lower frequency of 2500 kilocycles, the normal or lowermost setting of the counter 17 will be at 2500.

The reverse or decumulative rotation of counter 17 is controlled by a reverse stepper device the circuit of whose control magnet 21 is controlled by means of switch contacts 7, 22, and the contacts 10 and 11, by way of conductors 9 and 23. The relay 12 which controls the ten successive kilocycle steps of dial 18 is controlled by a zero beat requency detector 34. For this purpose, there is provided a spectrum generator 25 of any well-known type which generates simultaneously a series of equally spaced frequencies, for example with a spacing of 10 kilocycles. Thus the generator 25 may comprise a crystal controlled oscillator 26 generating a fixed frequency of 100 kilocycles which controls a multi-vibrator 27 that acts to generate simultaneously a series of frequencies spaced 10 kilocycles apart which provide check points for the oscillator 1, as well as providing automatic control signals for the counter 17 and for the frequency meter 28 and its associated mask control mechanism 29 as will be described. For example, the multi-vibrator 25, may produce a frequency spectrum which includes frequencies 2500 kilocycles, 2510 kilocycles, 2520 kilocycles, etc., up to the upper limit of the oscillator 1. For a detailed description of such a multi-vibrator frequency spectrum generator, reference may be had to any standard handbook on electronics, e. g., Radio Engineers Handbook, by F. E. Terman.

The output of oscillator 1 is supplied to any suitable load device 30. A portion of this output is also supplied to any well-known beat detector 31 to which is also supplied the signals from generator 25. For a detailed description of such a beat detector, reference may be had to Radio Engineers Handbook, by F. E. Terman. The output of detector 31 therefore consists of an audio frequency voltage. Thus, when the signal from oscillator 1 coincides with the frequency of a check point from generator 25, e. g., 2520 kilocycles, the beat frequency from detector 31 is zero. When the frequency of oscillator 1 is midway between two successive check points of generator 25, e. g., 2525 kilocycles, the beat frequency from detector 31 is 5000 cycles. As the frequency of oscillator 1 is varied over the first half of the interval between successive check points for example between 2520 kilocycles and 2525 kilocycles, the frequency of the beat note correspondingly increases linearly between zero and 5000 cycles; while during the second half of this same interval, for example 2525 to 2530 kilocycles, the beat note correspondingly decreases linearly from 5000 cycles to zero. This relation is clearly illustrated in the graph of Fig. 2, wherein four successive check points are illustrated. The audio frequency beat note voltage from detector 31 is amplified in a suitable audio frequency amplifier 32 which is preferably of the direct coupled type so as to amplify the entire range between zero and 5000 cycles.

The output of amplifier 32 is supplied in tandem to three separate circuits 33, 34, 35. Circuit 33 is an audio frequency measuring circuit which produces in its output a voltage which is proportional to the frequency of the input supplied to it from amplifier 32. For example, any well-known frequency discriminator circuit or electronic frequency counter circuit may be used for the device 33. The output of circuit 33 is applied to any suitable meter 28 whose scales are calibrated in cycles per second. One of these scales reads from zero to 5000 cycles per second in a forward or clockwise direction as illustrated in Fig. 3, and the other scale is calibrated in a reverse of counterclockwise direction from 5000 cycles to 10,000 cycles. This meter has a shiftable mask 36 having a window 37, the mask being arranged for upward and downward movement to expose only one of the scales at a time. The upward and downward positioning of mask 36 is controlled by a toothed wheel or toothed cam 38 which is adapted to be rotated in a step-by-step manner by the usual driving pawl 39 controlled by a suitable solenoid 40. For this purpose, the mask 36 carries a post or cam follower 41 which, through suitable leverage arrangements, engages the teeth of wheel 38. In Fig. 3, the wheel 38 is shown in such a position that the mask 36 is in its downward position exposing the 0-5000 scale. When the wheel 38 is moved one step under control of solenoid 40, the mask is raised so that the window 37 exposes only the 10,000-5,000 scale. When the wheel 38 has been moved one step, the mask 36 remains in its correspondingly set position until the solenoid 40 receives another operating impulse.

The meter is of course provided with a pointer 42 and with the usual meter coils for swinging the pointer across the scales in proportion to the voltage from circuit 33. Thus, there is provided at all times a continuous indication of the frequency difference between oscillator 1 and the next lower frequency check point from generator 25.

The second circuit 34 is a zero frequency detector of any well-known type such for example as a simple amplifier low-pass filter arrangement combined with a trigger circuit. It may consist for example of a suitable filter circuit and amplifier which produces an output impulse only when zero frequency is applied to its input, so as to operate the relay 12. Relay 12 has an additional set of contacts 43, 43a which, when closed, complete the energizing circuit for solenoid 40. Thus, each instant the oscillator 1 is tuned to the same frequency as a check point frequency of generator 25, e. g., 2520 kilocycles, the relay 12 operates to cause the upper scale (0-5000) on the meter 28 to be exposed. Likewise, each time the zero beat condition occurs as the oscillator 1 passes successive check points 2500, 2510, etc., an impulse is applied to the proper unit 16 or 21 depending upon the direction in which the knob 2 is being turned.

The third circuit 35 is a 5000 cycle detector which only responds when a 5000 cycle signal is applied to its input. For example, it may comprise an electromagnetically controlled reed which is tuned to 5000 cycles, although other well-known single frequency selecting arrangements may be employed. When a signal appears at the output of the detector 35, it causes relay 44 to be operated. Relay 44 closes through its contacts 45, 46, a circuit for operating the solenoid 40, whereupon the wheel 38 is rotated to present the next low point of wheel 38 to the arm 41, causing the window 37 to expose the lower scale (10,000-5,000).

From the foregoing description, it will be seen that when the knob 2 is turned, for example in a clockwise direction to increase the frequency of oscillator 1, member 5 closes contacts 7 and 8 to prepare the circuit for the "forward" stepper 16. Assume for example that the oscillator 1 has been previously tuned to 2520.2 kilocycles, in which event the counter 17 will be registering 2520 kilocycles, and the meter 28 would indicate 200 cycles. Also let it be assumed that the oscillator is now to be tuned to 2620.6 kilocycles. As the knob 2 is turned, it produces a continuously changing beat in the output of device 31 which varies from zero to 5000 cycles which signal is continuously indicated on the upper scale of meter 28. When the oscillator reaches 2525 kilocycles, the detector 35 comes into operation and causes mask 36 to blank off the upper scale of meter 28 and to expose only the lower scale, and at this instant the pointer 42 is at its full scale deflection and continues to indicate 5000 cycles on the lower scale. As the oscillator progresses from 2525 kilocycles towards 2530 kilocycles, the beat frequency current from device 31 decreases in frequency causing the pointer 42 to move down scale, which scale however is calibrated in reverse direction, thus correctly and continuously indicating the frequency in cycles per second. When the oscillator reaches the 2530 kilocycles check point, a zero beat frequency appears at the input of detector 34, causing relay 12 to operate. Relay 12 then causes the mask 36 to be restored to its lower position to expose the upper scale (0-5000) of the meter 28 and at the same time it causes the forward stepper 16 to advance the dial 18 of counter 17 one step to indicate 2530. The above sequence of operations is repeated as the oscillator 1 passes through successive check points until finally the counter 17 indicates the desired frequency of 2620, and the meter 28 indicates 600 cycles.

The foregoing arrangement provides a convenient means by which the final selected frequency setting of oscillator 21 can be read in coarse increments on the counter 17 in kilocycles, and the fine increments in cycles per second can be read on meter 28. It eliminates the necessity for providing a linear or some other definite tuning characteristic for the oscillator, the only requirement being that the oscillator 1 have good frequency stability. It is possible with this arrangement simply to substitute another oscillator for the oscillator 1 without affecting the accuracy of the indication. Thus, this other oscillator can be set to the frequency indicated by the counter 17 and then inserted into the circuit. Thereafter, the system would continuously indicate frequency as the new oscillator is tuned, in the manner above described.

Instead of employing a movable mask to expose the two scales of the meter 28, an arrangement such as shown in Fig. 5, may be employed. In this case, the scales are in the form of transparent markings on an otherwise opaque member 47. Located in back of each of the scales is a corresponding electric lamp bulb 48, 49, each bulb lighting up only its corresponding scale. In this arrangement, the arm 41 when in its lower position as shown in Fig. 5, closes a circuit from the current supply terminals 50 to lamp 49. When the arm 41 is riding on a high point of the wheel 38, the current is supplied only to the lamp 48.

Various changes and modifications may be made in the disclosed embodiments without departing from the spirit and scope of the invention.

What is claimed is:

1. A frequency generating arrangement, comprising an oscillator to be tuned to any desired frequency throughout a predetermined range, a frequency spectrum generator for producing equally-spaced frequency check points distributed throughout said range, and circuit arrangements and frequency-indicating means controlled by the combined frequency outputs of said oscillator and said generator for producing continuous numerical indications of the oscillator frequency as it is being tuned to different frequencies in said range, said circuit arrangements including a beat frequency detector for producing an audio frequency beat signal which varies between successive zero beats which zero beats correspond to the tuning of the oscillator between successive check points from said spectrum generator, and means controlled by said beat signals for producing a coarse numerical indication representing said check points, and a separate fine numerical indication representing the incremental frequency setting of said oscillator as it is being tuned between said successive check points.

2. A frequency generating arrangement, comprising an oscillator to be tuned to any desired frequency throughout a predetermined range, a frequency spectrum generator for producing equally-spaced frequency check points distributed throughout said range, circuit arrangements and frequency-indicating means controlled by the combined frequency outputs of said oscillator and said generator for producing continuous numerical indications of the oscillator frequency as it is being tuned to different frequencies in said range, said indicator means comprising a numerical dial counter device for indicating the successive check points of said spectrum generator, and a calibrated indicating meter for indicating the incremental frequencies between successive check points.

3. A frequency generating arrangement, comprising an oscillator to be tuned to any desired frequency throughout a predetermined range, a frequency spectrum generator for producing equally-spaced frequency check points distributed throughout said range, circuit arrangements and frequency-indicating means controlled by the combined frequency outputs of said oscillator and said generator for producing continuous numerical indications of the oscillator frequency as it is being tuned to different frequencies in said range, said indicator means including calibrated frequency meter arrangements for indicating oscillator frequencies between successive check points, said meter having a pair of scales, one scale covering one portion of the frequency range between successive check points and the other scale covering the remaining portion of said range between said successive check points, and means responsive to the tuning of said oscillator throughout said range for automatically rendering only the proper one of said scales effective for indication purposes.

4. A direct reading frequency generating arrangement comprising an oscillator to be tuned to any desired frequency throughout a predetermined range, a frequency spectrum generator for simultaneously producing frequency check points equally distributed throughout said range, means to produce a beat note signal representing the frequency difference between said oscillator and said spectrum generator which signal continuously increases in frequency from zero to a maximum and then from said maximum back to zero between successive check points, a frequency counter device, a frequency meter device, means to apply said beat note signal to control the setting of said meter device, a zero beat frequency detector device, and means controlling the said counter device by the output of said zero beat detector device.

5. A direct reading frequency generating arrangement according to claim 4 in which said frequency meter device comprises two separate frequency-indicating scales each calibrated throughout a different portion of the range between successive check points, and means are provided for rendering the correct scale effective and automatically in response to the presence of said maximum beat frequency.

6. A direct reading frequency generating arrangement according to claim 4 in which said frequency meter device comprises two separate frequency-indicating scales, one scale being calibrated in a forward direction throughout half the range between successive check frequencies from said spectrum generator, and the other scale being calibrated in a reverse direction throughout the remaining half of said range between successive check frequencies.

7. A direct reading frequency generating arrangement according to claim 4 in which said beat note continuously increases from zero to a maximum frequency located midway between successive check points and then continuously decreases from said maximum to zero as said oscillator is being tuned between successive check points.

8. A direct reading frequency generating arrangement according to claim 4 in which said counter device is provided with forward and reverse actuators, and switch means are provided for selectively rendering one of said actuators effective in accordance with the direction of tuning of said oscillator to increase the oscillator frequency, and for selectively rendering the other actuator effective in accordance with the tuning of said oscillator to decrease its frequency.

9. A direct reading frequency generating arrangement according to claim 4 in which said oscillator has a tuning knob which is coupled to a two-position switch for operating said switch to either position in accordance with the direction of turning of said knob, and said counter device is provided with forward and reverse actuators which are rendered selectively effective by said switch.

10. A frequency generating arrangement according to claim 4 in which said oscillator has a tuning knob which is coupled to a two-position switch to operate said switch to either position in accordance with the direction of turning of said knob, and said counter device is provided with forward and reverse actuators, and means are provided for selectively rendering said actuators effective under control of said switch and under control of the output of said zero beat frequency detector.

11. A direct reading signal generator for radio apparatus and the like, comprising an oscillator to be tuned to any desired frequency throughout a predetermined range, a frequency spectrum generator for simultaneously producing frequency check points equally distributed throughout said range, a numerical counter device for cumulatively indicating the frequency of the oscillator as it is successively tuned through said check points, a frequency-calibrated meter for indicating the incremental frequency change of the oscillator as it is being tuned from one check point to the next check point, a beat detector excited by the oscillator frequency and the spectrum generator frequency, a frequency-measuring device connecting said beat detector to said meter, a zero beat frequency detector controlled by the output of said beat detector, and relay switch means controlled by said zero beat detector for controlling the actuation of said numerical counter.

12. A direct reading signal generator according to claim 11 in which said numerical counter device is provided with forward and reverse actuators, and said oscillator is provided with a tunning knob, said knob being coupled to a two-position switch which is arranged to assume one position when said knob is rotated in one direction and to assume another position when said knob is rotated in the opposite direction, and respective operating circuits are provided for said actuators which operating circuits are selectively controlled by said two-position switch.

13. A direct reading signal generator according to claim 11 in which said frequency-measuring device comprises a meter having a pair of scales each calibrated over a different portion of the frequency range between successive check points from said spectrum generator, a shiftable mask for rendering only one of said scales effective, and means controlled by the output of said zero beat frequency detector for selectively operating said mask.

14. A direct reading signal generator according to claim 11 in which said frequency-measuring device comprises a meter having two separate scales, one calibrated forwardly over half the frequency range between successive check points from the spectrum generator and the other scale calibrated reversely over the remaining half of the said frequency range between successive check points, scale control means for rendering only one scale effective, said scale control means including a relay controlled by the output of said zero beat frequency detector, another detector for producing a signal when said oscillator reaches a frequency midway between successive check points, and another relay controlled by the output of the last-mentioned detector.

15. An indicating arrangement of the character described, comprising a meter for indicating values over a predetermined range, said meter having a pair of scales, one scale being forwardly calibrated between one portion of said range, and the other scale being reversely calibrated between the remaining portion of said range, a single deflectable pointer cooperating with both scales, means for automatically rendering the proper one of said scales effective, the last-mentioned means comprising a signal source whose frequency can be varied from zero to maximum representing the said one portion of said range and then from said maximum to zero to represent said remaining portion of said range, means responsive to said signal to actuate said pointer, a zero beat frequency detector for producing a control voltage when said signal is at zero frequency, another detector for producing a control voltage when said signal is at said maximum frequency, and scale selector means responsive to the first-mentioned control voltage to render one scale effective and responsive to the other control voltage to render the other scale effective.

16. An indicating arrangement according to claim 15 in which the said means for rendering the proper scale effective comprises, a shiftable scale mask, a step-by-step mechanism for operating said mask, a first relay controlled by the output of said zero beat detector for operating said step-by-step mechanism to cause said mask to expose one of said scales, and another relay responsive to said other detector for operating said step-by-step mechanism to cause said mask to expose the other of said scales.

ROY E. COLANDER.

REFERENCES CITED

The following references are of record in the file of this patent:

UNITED STATES PATENTS

| Number | Name | Date |
| --- | --- | --- |
| 2,337,328 | Hathaway | Dec. 21, 1943 |